Patented July 7, 1953

2,644,797

UNITED STATES PATENT OFFICE 2,644,797

GASIFICATION OF SULFURIC ACID WASTES

William H. Shiffler, San Francisco, Calif., assignor to California Research Corporation, San Francisco, Calif., a corporation of Delaware No Drawing. Application December 9, 1947,
Serial No. 790,703

9 Claims. (Cl. 252—373)

The present invention is directed to a process for the gasification of sulfuric acid wastes formed in the course of refining hydrocarbon oils with sulfuric acid. More particularly, the process of the invention provides a method for gasification of sulfuric acid sludge and acid tars under conditions of controlled partial combustion to yield readily usable gaseous products.

According to typical present practice, sludges formed during the treatment of gasoline and other heavier oils with sulfuric acid are mixed with water and contacted with steam, usually at an elevated temperature and superatmospheric pressure, to hydrolyze sulfonic acids contained in the sludge. The mixture is then settled, forming a dilute sulfuric acid layer and an acid tar layer. The acid tar layer consists essentially of carbon, hydrogen, oxygen and sulfur and normally contains 10–15% sulfuric acid and 6–10% total sulfur present as sulfuric acid and as combined organic sulfur. The tar layer is burned, usually under boilers to generate steam, and the combustion gases, containing principally carbon dioxide, water vapor, sulfur dioxide and sulfur trioxide, are released to the atmosphere.

The term "sulfuric acid wastes" is employed in the specification and in the appended claims to include both sulfuric acid sludges and the acid tars which may be separated from the sludges by treatment with water and steam. The gases produced in the combustion of these wastes present a serious fume nuisance. Refineries adjacent to metropolitan and agricultural areas are continuously faced with an annoying and expensive problem of fume control. Some acid sludges will not separate into an acid layer and a tar layer on steaming and must be burned without prior acid recovery. In the case of these sludges the fume nuisance is greatly increased.

According to the present invention, sulfuric acid sludge or tar produced by steaming sludge is fed to a combustion zone and burned with oxygen at a preferred temperature of about 2500° F. and preferably at an elevated pressure. The oxygen supplied to the combustion zone is less than the amount required for the complete combustion of the sludge or tar but is sufficient to completely gasify the sludge or tar with the formation predominantly of carbon monoxide, hydrogen and hydrogen sulfide accompanied by the formation of some carbon dioxide and water.

It has been found that in attempting to burn sulfuric acid wastes with a reduced oxygen supply, a very complex situation is encountered. By varying the temperature and oxygen content in the combustion zone, carbon, hydrogen, sulfur, carbon monoxide, carbon dioxide, carbon disulfide, carbonyl sulfide, sulfur dioxide, sulfur trioxide, hydrogen sulfide, water vapor, and light hydrocarbon gases may be produced in varying amounts in the combustion gas product. The equilibria of upward of thirty chemical reactions of these substances with each other and with oxygen enter into the determination of the combustion product composition. Some of these reactions have received little study and their equilibrium data over a range of temperatures is meager.

It has been found that if the total oxygen content of the combustion zone is in excess of the amount stoichiometrically required for the conversion of all of the carbon in the acid waste to carbon monoxide and is less than the amount stoichiometrically required to convert all of the carbon in the waste to carbon dioxide and all of the hydrogen in the waste to water vapor, then substantially all of the combined sulfur in the product gases is in the form of hydrogen sulfide. Under preferred conditions the remainder of the product gas consists predominantly of hydrogen and carbon monoxide and has an appreciable content of carbon dioxide and water vapor. The total oxygen in the combustion zone above referred to includes both the elemental oxygen supplied to support the acid waste combustion and the combined oxygen contained in the waste.

Burning of sulfuric acid sludges in this manner has marked advantages over burning them in the usual manner. Hydrogen sulfide may be efficiently and economically recovered from the product gases, for example, by conventional absorption in alkanol amines in a Girbotol unit, and subsequently converted to sulfur or sulfuric acid. The remaining gas, predominantly carbon monoxide and hydrogen, may readily be adapted for use as part of the make gas charged to a hydrocarbon synthesis reaction effected by the Fischer-Tropsch or Oxo process. It may also be reacted with steam, the carbon oxides removed, and the hydrogen charged to an ammonia synthesis unit, or it may simply be used as a fuel, or it may be reacted with steam to obtain an $H_2$ to CO ratio of 2 to 1, the excess $CO_2$ removed and the hydrogen and carbon monoxide charged to a methanol synthesis unit.

By following the process of this invention in sludge disposal, the fuel value of the sludge is utilized, the combustion gases may be utilized and fume nuisance is avoided.

In burning a sulfuric acid sludge or an acid tar separated from such a sludge according to the process of the invention, analysis is made to determine the carbon, hydrogen, oxygen and sulfur contents of the material. From this determination the amount of oxygen required to be added to the combustion zone with the material in order to make the total oxygen in the combustion zone stoichiometrically sufficient to convert all of the carbon to carbon monoxide is calculated. The amount of oxygen required to be added in order to make the total oxygen in the combustion zone stoichiometrically sufficient to convert all of the carbon to carbon dioxide and all of the hydrogen to water is similarly calculated. These two calculated quantities of oxygen represent, respectively, the lower and the upper limits of the oxygen content of the combustion zone. The sludge is then introduced into the combustion zone in finely divided form together with an amount of oxygen intermediate the two calculated limits and burned. The combustion zone is preheated to combustion reaction temperature in the neighborhood of 2500° F. and the oxygen is preheated to 600-700° F. The sludge is also preferably preheated the degree of preheat depending on the coking and fouling tendencies of the particular sludge.

In addition to determining the quantity of oxygen which is suitably introduced into the combustion zone by analysis of the sludge and calculation as above described, auxiliary control during operation may be exercised by varying the oxygen supplied to the combustion zone and/or adding an auxiliary hydrocarbon fuel to the combustion zone as hereinafter described, until the range is found in which the combustion product gas shows a substantial content of elemental hydrogen and some carbon dioxide. Such simultaneous appearance of hydrogen and carbon dioxide in the product gas indicates that oxygen is being supplied to the combustion zone at close to the optimum amount within the above-described limits and that the only further variations in the oxygen supply which may be necessary will be minor changes directed to temperature control.

Maintenance of a high temperature in the reaction zone is essential in order to effect complete gasification of the sludge. The temperature is preferably about 2500° F., or higher, but satisfactory operation may be obtained at temperatures as low as about 2200° F. A tendency for a part of the carbon to burn to carbon dioxide and for part of it to be carried in the gas and deposited on the surfaces of the combustion zone as soot is observed; subsequently, the carbon dioxide and carbon react to form carbon monoxide. Maintenance of a high temperature in the combustion zone increases the rate of this latter reaction and prevents accumulation of elemental carbon. In addition to preheating the oxygen and sludge, maintenace of the high temperature is facilitated by the use of oxygen or an oxygen rich gas rather than air to effect the combustion. Enriched air containing at least 65% oxygen and preferably about 95% oxygen should be employed for the purpose. Fuel oil, having a higher heat of combustion than the acid waste being gasified may be mixed with the waste prior to its introduction into the combustion zone. The added fuel oil serves the dual purposes of reducing the viscosity of the waste thus facilitating its introduction into the combustion zone in a finely divided spray and of supplying additional heat to the combustion zone facilitating temperature maintenance. The maintenance of the high temperature required during combustion may be further facilitated by controlling the oxygen supplied to the zone so as to approach the upper limit of oxygen content previously described. When this is done a larger part of the carbon and hydrogen are burned to carbon dioxide and water vapor, respectively, with the liberation of additional heat.

It is found that at this high temperature appreciable quantities of sulfur dioxide appear in the combustion product gas even when the oxygen content of the combustion zone is below that stoichiometrically sufficient to convert all of the carbon and hydrogen in the sludge to carbon dioxide and water respectively, that is, below the upper limit of the oxygen content of the combustion zone according to the process of the invention. It is found that sulfur dioxide content of the effluent combustion product gas may be reduced by increasing the pressure in the combustion zone to 10–20 atmospheres or higher or by cooling the combustion product gas to 800–1000° F. in the upper part of the combustion zone prior to its withdrawal therefrom. The cooling may be conveniently effected by mounting a boiler in the upper portion of the combustion zone.

It is well known that the composition of sulfuric acid sludges is subject to a wide variation. Accordingly, the amount of elemental oxygen supplied to the combustion zone in order to maintain its total oxygen content within the above described limits must depend upon the sludge composition as determined by analysis. In the practice of the process of the invention the sludge to be gasified may be treated with water and steam and settled to form an acid layer and an acid tar layer in the conventional manner. The acid layer is drawn off to be concentrated and reused and the acid tar layer is gasified in the manner described. Where the character of the sludge does not permit separation into an acid layer and an acid tar layer the whole sludge is gasified. It is found that some sludges, particularly those of this latter character, may have an oxygen content due to their content of acid and water which may exceed the above described lower limit of total oxygen content in the combustion zone. In the gasification of such sludges difficulty is experienced in maintaining the necessary high temperature in the combustion zone. It has been found that satisfactory gasification of sulfuric acid waste is difficult if it contains oxygen in amounts approaching the total oxygen requirement for conversion of the waste to gas according to the process of the invention. Such wastes are characterized by low carbon to oxygen ratios. In order to successfully accomplish their gasification according to the process of the invention these wastes are mixed with fuel oil in amount at least sufficient to raise the ratio of carbon atoms to oxygen atoms in the mixture to 1:1. The addition of the fuel oil in such quantity to sludges and tars of this character produces a mixture stoichiometrically adapted to yield the desired products of combustion according to the process of the invention in addition to decreasing sludge viscosity and facilitating the maintenance of high temperature.

The following example illustrates the gasification of sulfuric acid wastes according to the process of the invention.

Example

A composite of sulfuric acid refinery wastes was found to contain 45.0 weight per cent carbon, 8.0 weight per cent hydrogen, 34.5 weight per cent oxygen, and 11.5 weight per cent sulfur. The upper and lower limits of the oxygen required to burn a sample of this composite weighing 2667 grams according to the process of this invention were calculated. It was calculated that the lower limit of total oxygen, that is, the amount required to convert all of the carbon to carbon monoxide, was 1600 grams and that the upper limit of total oxygen, the amount required to convert all of the carbon to carbon dioxide and all of the hydrogen to water, was 4907 grams. The sample contained 920 grams of oxygen. It was determined to add 1414 grams of oxygen to the combustion zone in burning the sample thus bringing the total oxygen content of the combustion zone to 2334 grams, a quantity intermediate the calculated limits. When the sample is burned with this quantity of oxygen at about 2500° F. and at a pressure of 300 p. s. i. a. the combustion products will have the composition in the following table:

TABLE

| Gas | Mol Percent in Product |
|---|---|
| CO | 42.2 |
| $CO_2$ | 5.1 |
| COS | 0.05 |
| $H_2$ | 28.8 |
| $H_2O$ | 17.4 |
| $H_2S$ | 4.4 |
| $N_2$ | 2.0 |

It is seen that substantially all of the sulfur of the waste treated is converted to hydrogen sulfide which is readily removable from the combustion product gas. Following the removal of the hydrogen sulfide, the remaining gas may be burned as a fuel substantially free of fume forming tendencies or adapted for use in chemical process as described above.

In the event that it is desired to utilize the product gas in ammonia synthesis or in a Fischer-Tropsch synthesis, a considerable advantage is obtained as a result of maintaining an elevated pressure, as above described, in the combustion zone. If, for example, a pressure of 20 atmospheres is employed, roughly five mols of product gas at this pressure are produced from each mol of oxygen charged to the combustion zone. A considerable saving in thus realized in equipment and energy requirements for bringing the gas fed to the synthesis unit to proper reaction pressure. In the event that it is desired to employ the process of the invention in combination with an ammonia synthesis unit the oxygen enriched air charged to the combustion zone may be selected to have a nitrogen content which insures the presence in the product gas of a quantity of nitrogen sufficient to combine with the hydrogen therein to form ammonia. Following the removal of the carbon oxides, hydrogen sulfide, water and carbonyl sulfide from the product gas the residual gas will consist essentially of nitrogen and hydrogen in suitable proportions for ammonia synthesis.

A variety of sulfur acid sludges and acid tars separated from these sludges ranging in total sulfur content from 6% to 24% undergo gasification according to the process of this invention with the formation of a product gas substantially free of sulfur dioxide and sulfur trioxide. Substantially all of the sulfur of the sludge is recovered in the form of hydrogen sulfide from the product gas and the residue of the gas consists predominantly of hydrogen and carbon monoxide.

I claim:

1. The method of burning sulfuric acid wastes formed in the refining of petroleum distillates with concentrated sulfuric acid to convert the sulfur contained in the wastes predominantly to hydrogen sulfide, which comprises introducing the acid waste into a combustion zone maintained at an elevated temperature above about 2200° F. in the presence of added oxygen sufficient to raise the total oxygen content of the combustion zone above the amount stoichiometrically required to convert all of the carbon in the acid waste to carbon monoxide but insufficient to raise the total oxygen in the combustion zone to the amount stoichiometrically required to convert all of the carbon and all of the hydrogen in the acid waste to carbon dioxide and water respectively.

2. The method of burning sulfuric acid wastes formed in the refining of petroleum distillates with concentrated sulfuric acid to convert the sulfur contained in the wastes predominantly to hydrogen sulfide, which comprises introducing the waste in finely divided form into a combustion zone maintained at an elevated temperature above about 2200° F., simultaneously introducing into the combustion zone and into contact with the finely divided acid waste a combustion supporting gas containing at least 65% of elemental oxygen to gasify the acid waste by combustion, maintaining the total oxygen content of the gas and waste in the combustion zone above that stoichiometrically required to convert all of the carbon contained in the waste to carbon monoxide and substantially below that stoichiometrically required for the complete combustion of the waste such that the gaseous combustion product effluent from the combustion zone is characterized by a substantial content of elemental hydrogen.

3. The method of gasifying sulfuric acid sludges formed in the refining of petroleum distillates with concentrated sulfuric acid to convert the sulfur contained in the wastes predominantly to hydrogen sulfide, which comprises adding fuel oil to the sludge in amount sufficient to form a mixture in which the ratio of gram atoms of carbon to gram atoms of oxygen is above 1 to 1, introducing said mixture in finely divided form into a combustion zone maintained at an elevated temperature above about 2200° F., and at an elevated pressure of 10-20 atmospheres, simultaneously introducing into the combustion supporting gas containing at least 65% of elemental oxygen in amount sufficient to raise the total oxygen content of the combustion zone above the amount stoichiometrically required to convert all of the carbon in said mixture to carbon monoxide but insufficient to raise the total oxygen in the combination zone to the amount stoichiometrically required to convert all of the carbon and all of the hydrogen in said mixture to carbon dioxide and water respectively.

4. The method of disposing of sulfuric acid sludges formed in the refining of petroleum distillates with concentrated sulfuric acid to convert sulfur contained in the wastes predominantly to hydrogen sulfide, which comprises agitating the sludge with water and steam at an elevated temperature, and thereafter settling the diluted sludge to separate an acid layer and an acid tar layer, mixing the acid tar layer with fuel oil in amount sufficient to form a mixture in which the ratio of gram atoms of carbon to gram atoms of oxygen is above 1 to 1, introducing said mixture into a combustion zone maintained at an elevated temperature above about 2200° F. and at an elevated pressure of 10–20 atmospheres, simultaneously introducing elemental oxygen into the combustion zone and into contact with the mixture therein, the quantity of oxygen introduced being sufficient to raise the total oxygen content of the combustion zone above the amount stoichiometrically required to convert all of the carbon in the zone to carbon monoxide but insufficient to raise the total oxygen content of the zone to the amount stoichiometrically required to convert all of the carbon and all of the hydrogen in the zone to carbon dioxide and water respectively.

5. The method of burning sulfuric acid wastes formed in the refining of petroleum distillates with concentrated sulfuric acid to convert the sulfur contained in the wastes predominantly to hydrogen sulfide, which comprises introducing the waste in finely divided form into a combustion zone maintained at an elevated temperature of about 2500° F. and at an elevated pressure of about 20 atmospheres, simultaneously introducing into the combustion zone and into contact with the finely divided waste a combustion supporting gas comprising at least 65% by volume of elemental oxygen to gasify the waste by combustion, maintaining the ratio of total oxygen to acid waste in the combustion zone above that stoichiometrically required to convert all of the carbon contained in the waste to carbon monoxide and substantially below that stoichiometrically required for the complete combustion of the waste such that the gaseous combustion product effluent from the combustion zone consists predominantly of carbon monoxide and hydrogen and contains lesser amounts of carbon dioxide and water vapor.

6. The method of treating sulfuric acid wastes formed in the refining of petroleum distillates with concentrated sulfuric acid to obtain a product gas suitable for ammonia synthesis which comprises introducing the waste in finely divided form into a combustion zone maintained at an elevated temperature above about 2200° F. and at an elevated pressure above about 10 atmospheres, simultaneously introducing into the combustion zone and into contact with the finely divided waste therein a combustion supporting gas consisting essentially of nitrogen and oxygen and containing at least 65% of oxygen to gasify the acid waste by combustion, maintaining the ratio of total oxygen to acid waste in the combustion zone substantially below that stoichiometrically required for the complete combustion of the waste such that the gaseous combustion product effluent from the combustion zone is characterized by a substantial content of elemental hydrogen whereby the sulfur contained in said waste is converted predominantly to hydrogen sulfide, successively separating the oxides of carbon and hydrogen sulfide from the combustion zone effluent and drying the residual gas to obtain a product consisting essentially of nitrogen and hydrogen.

7. The method of treating sulfuric acid wastes formed in the refining of petroleum with concentrated sulfuric acid to obtain a product gas suitable for use as make gas in a Fischer-Tropsch synthesis which comprises introducing the acid waste in finely divided form into a combustion zone maintained at an elevated temperature above about 2200° F. and at an elevated pressure above about 10 atmospheres, simultaneously introducing into the combustion zone and into contact with the finely divided waste therein a combustion supporting gas containing about 95% of elemental oxygen to gasify the acid waste by combustion, maintaining the ratio of total oxygen to acid waste in the combustion zone substantially below that stoichiometrically required for the complete combustion of the waste such that the gaseous combustion product effluent from the combustion zone consists predominantly of hydrogen and carbon monoxide and contains lesser amounts of carbon dioxide and water vapor whereby the sulfur contained in the waste is converted predominantly to hydrogen sulfide, separating carbon dioxide and hydrogen sulfide from the combustion zone effluent and drying the residual gas to obtain a product consisting essentially of carbon monoxide and hydrogen.

8. The method of treating sulfuric acid wastes formed in the refining of petroleum with concentrated sulfuric acid to obtain a product gas suitable for use as synthesis gas for methanol synthesis which comprises introducing the acid waste in finely divided form into a combustion zone maintained at an elevated temperature above about 2200° F. and at an elevated pressure above about 10 atmospheres, introducing into the combustion zone with said waste a hydrocarbon fuel in sufficient amount that the ratio of gram atoms of carbon to gram atoms of oxygen in the waste-fuel mixture produced is above 1 to 1, simultaneously introducing into the combustion zone and into contact with the finely divided waste therein a combustion supporting gas containing at least 65% by volume of elemental oxygen to gasify the waste by combustion, the quantity of oxygen introduced being sufficient to raise the total oxygen content of the combustion zone above the amount stoichiometrically required to convert all of the carbon in the zone to carbon monoxide but insufficient to raise the total oxygen content of the combustion zone to the amount stoichiometrically required to convert all of the carbon and all of the hydrogen in the zone to carbon dioxide and water respectively whereby the sulfur contained in the waste is converted predominantly to hydrogen sulfide, separating hydrogen sulfide from the combustion product gas, reacting the residual combustion product gas with sufficient steam to increase the ratio of hydrogen to carbon monoxide therein to about 2 to 1, and removing carbon dioxide and water vapor from the reacted residual gas to obtain a product gas consisting essentially of hydrogen and carbon monoxide in a ratio of about 2 to 1.

9. The method of burning sulfuric acid wastes formed in the refining of petroleum distillates with concentrated sulfuric acid to convert the sulfur contained in said wastes predominantly to hydrogen sulfide, which comprises contacting oxygen gas with the waste in a combustion zone at an elevated temperature sufficient to cause combustion in said zone, maintaining a superatmospheric pressure in the combustion zone, and maintaining the total oxygen content of the combustion zone above that stoichiometrically required to convert all of the carbon contained in the waste to carbon monoxide and below that stoichiometrically required to convert all of the carbon and all of the hydrogen in the acid waste to carbon dioxide and water respectively.

WILLIAM H. SHIFFLER.

References Cited in the file of this patent

UNITED STATES PATENTS

| Number | Name | Date |
|---|---|---|
| Re. 14,277 | Garner | Mar. 27, 1917 |
| 1,407,323 | Browning | Feb. 21, 1922 |
| 1,843,063 | Burke | Jan. 26, 1932 |
| 1,953,225 | Hechenbleikner | Apr. 3, 1934 |
| 2,051,363 | Beekley | Aug. 18, 1936 |
| 2,110,267 | Harrington | Mar. 8, 1938 |
| 2,123,000 | Carter | July 5, 1938 |
| 2,199,475 | Wilcox | May 7, 1940 |
| 2,207,610 | Chappell | July 9, 1940 |
| 2,310,784 | Herbert | Feb. 9, 1943 |